US011831030B2

(12) United States Patent
Chiang et al.

(10) Patent No.: US 11,831,030 B2
(45) Date of Patent: Nov. 28, 2023

(54) METHOD OF FORMING A BRAZED JOINT HAVING MOLYBDENUM MATERIAL

(71) Applicant: Pacesetter, Inc., Sylmar, CA (US)

(72) Inventors: Shichan Chiang, Valencia, CA (US); Christopher Hallmark, Pickens, SC (US); Michael Erickson, Redford, MI (US); Kurt Erickson, Anderson, SC (US); Nicholas Hamor, Easley, SC (US); Jeffrey Armstrong, Pickens, SC (US); Philip Edward Poole, Greenville, SC (US); Nathan Messerich, Easley, SC (US)

(73) Assignee: PACESETTER, INC., Sylmar, CA (US)

( * ) Notice: Subject to any disclaimer, the term of this patent is extended or adjusted under 35 U.S.C. 154(b) by 194 days.

(21) Appl. No.: 16/417,473

(22) Filed: May 20, 2019

(65) Prior Publication Data

US 2019/0363313 A1 Nov. 28, 2019

Related U.S. Application Data

(60) Provisional application No. 62/674,948, filed on May 22, 2018.

(51) Int. Cl.
*B23K 1/00* (2006.01)
*B23K 1/19* (2006.01)
(Continued)

(52) U.S. Cl.
CPC ......... *H01M 50/179* (2021.01); *B23K 1/0004* (2013.01); *B23K 1/0016* (2013.01);
(Continued)

(58) Field of Classification Search
CPC ............. H01M 50/179; H01M 50/528; H01M 50/533; H01M 50/534; H01M 50/559;
(Continued)

(56) References Cited

U.S. PATENT DOCUMENTS 2,464,981 A 3/1949 Leathers et al.
2,946,119 A 7/1960 Jones et al.
(Continued)

FOREIGN PATENT DOCUMENTS

EP 0806263 A1 11/1997
EP 1791198 A2 5/2007
(Continued)

OTHER PUBLICATIONS

"Welding and Brazing of Molybdenum" by N.E. Weare et al, (1959).
(Continued)

*Primary Examiner* — Kwang Han
(74) *Attorney, Agent, or Firm* — WOMBLE BOND DICKINSON (US) LLP

(57) ABSTRACT

A method of forming a brazed joint is described. The method includes pressing a non-molybdenum component, such as a cross pin of a battery case assembly, against a molybdenum component, such as a terminal pin of the battery case assembly, and applying one or more electrical pulses to form an interface liquid layer between the components that cools to form the brazed joint. At least one of the electrical pulses has a constant voltage over a pulse time. A contact resistance between the components can decrease during the pulse time, and thus, the constant voltage can cause an uncontrolled electrical current of the electrical pulse to increase. The increasing electrical current heats the components sufficiently to form the interface liquid layer having a predetermined thickness that provides a required bend strength.

(Continued)

Removal of surface oxides provide consistent mechanical strength for this joint. Other embodiments are also described and claimed.

18 Claims, 7 Drawing Sheets

(51) Int. Cl.
    H01M 50/528     (2021.01)
    H01M 50/534     (2021.01)
    H01M 50/533     (2021.01)
    H01M 50/562     (2021.01)
    H01M 50/566     (2021.01)
    B23K 103/08     (2006.01)
    B23K 103/18     (2006.01)
    H01M 50/179     (2021.01)
    B23K 26/38      (2014.01)
    B23K 1/20       (2006.01)
    H01M 50/559     (2021.01)
    H01M 50/184     (2021.01)
    H01M 50/107     (2021.01)
    H01M 50/152     (2021.01)
    H01M 50/188     (2021.01)
    H01M 50/193     (2021.01)

(52) U.S. Cl.
    CPC ............. *B23K 1/19* (2013.01); *B23K 1/206* (2013.01); *B23K 26/38* (2013.01); *H01M 50/528* (2021.01); *H01M 50/533* (2021.01); *H01M 50/534* (2021.01); *H01M 50/559* (2021.01); *H01M 50/562* (2021.01); *H01M 50/566* (2021.01); *B23K 2103/08* (2018.08); *B23K 2103/18* (2018.08); *H01M 50/107* (2021.01); *H01M 50/152* (2021.01); *H01M 50/184* (2021.01); *H01M 50/188* (2021.01); *H01M 50/193* (2021.01); *H01M 2220/30* (2013.01); *Y02E 60/10* (2013.01)

(58) Field of Classification Search
    CPC ............ H01M 50/562; H01M 50/566; H01M 50/107; H01M 50/152; H01M 50/184; H01M 50/188; H01M 50/193; H01M 2220/30; B23K 1/0004; B23K 1/0016; B23K 1/19; B23K 1/206; B23K 26/38; B23K 2103/08; B23K 2103/18; Y02E 60/10
    See application file for complete search history.

(56) References Cited

U.S. PATENT DOCUMENTS

| | | |
|---|---|---|
| 5,750,286 A | 5/1998 | Paulot et al. |
| 5,770,832 A | 6/1998 | Carnes et al. |
| 5,811,206 A | 9/1998 | Sunderland et al. |
| 6,037,559 A | 3/2000 | Okabe et al. |
| 6,245,464 B1 | 6/2001 | Spillman et al. |
| 6,403,913 B1 | 6/2002 | Spinella et al. |
| 6,635,381 B2 | 10/2003 | Spillman et al. |
| 6,765,171 B1 | 7/2004 | Hengel et al. |
| 6,929,881 B2 | 8/2005 | Wutz et al. |
| 6,946,220 B2 | 9/2005 | Probst et al. |
| 8,081,419 B2 | 12/2011 | Monroe et al. |
| 8,648,255 B2 | 2/2014 | Talamine et al. |
| 2004/0101746 A1 | 5/2004 | Ota et al. |
| 2004/0191621 A1 | 9/2004 | Heller, Jr. |
| 2005/0103406 A1 | 5/2005 | Zhao et al. |
| 2007/0037054 A1 | 2/2007 | Kikuchi et al. |
| 2007/0178383 A1* | 8/2007 | Viavattine ............... H01M 4/80 428/615 |
| 2009/0011269 A1 | 1/2009 | Urushihara et al. |
| 2009/0233174 A1* | 9/2009 | Okabe ................ H01M 50/528 429/223 |
| 2011/0123856 A1* | 5/2011 | Dai ...................... B23K 11/002 429/179 |
| 2011/0293995 A1 | 12/2011 | Sasaki et al. |
| 2016/0156013 A1* | 6/2016 | Yamauchi ............. B32B 15/015 427/180 |
| 2019/0134745 A1* | 5/2019 | Hartwig ............... B23K 26/323 |

FOREIGN PATENT DOCUMENTS

| | | |
|---|---|---|
| EP | 1791198 A3 | 12/2008 |
| EP | 2325928 B1 | 3/2018 |
| JP | 03230882 A | * 10/1991 |
| JP | 03203230882 A | 10/1991 |

OTHER PUBLICATIONS

Lampman, S. "Weld Integrity and Performance", ASM Intl., Chapters 1 and 15. (1997).
Masumoto, H. et al. "Joining of molybdenum and titanium", J of Light Metal Welding & Construction, vol. 31, No. 5, pp. 1-6 (1993).
Saida, K. "The influence of base metal grain size on isothermal solidification during transient liquid-phase brazing of nickel", J Mater Sci, vol. 28, No. 23, pp. 6427-6432 (Dec. 1993).
David, S.A. et al. Welding: Solidification and Microstructure, pp. 1-11, retrieved from the Internet Sep. 28, 2018 at: https://www.tms.org/pubs/journals/JOM/0306/David-0306.html.
ASM Intl. "Diffusion Brazing", 15 pgs., retrieved from the Internet 2005 at https://www.asminternational.org.
Kobayashi, S. et al. "Control of intermetallic compound layers at interface between steel and aluminum by diffusion-treatment", Materials Science and Engineering A—structural Materials Properties Microstructure and Processing vol. 338, No. 1, pp. 44-53 (2002).
Zhang, Z.W. et al., "Dynamics and mechanism of columnar grain growth of pure iron under directional annealing", Acta Materialia, vol. 55, pp. 5988-5998 (2007).
Lampman, S. "284/ Weld Integrity and Performance", ASM Intl., 1 pg. (1997).
Ely, K.J. et al. Microresistance spot welding of Kovar, steel, and nickel, Science and Technology of Welding and Joining, vol. 6, No. 2, pp. 63-72 (2001).
Balder, T.C. "Influence of the Peltier Effect in Resistance Welding", Philips Technical Review, vol. 20, pp. 188-192 (1958).
Wei, H.L. et al. "Three-dimensional modeling of grain structure evolution during welding of an aluminum alloy", Acta Materialia, vol. 126, pp. 413-425 (2017).
The American Welding Society to Advance the Science "Resistance Welding", Welding Journal, p. 56, (2003).
Zhou, Y. "Weldability of Thin Sheet Metals by Small-Scale Resistance Spot Welding using High-Frequency Inverter and Capacitor-Discharge Power Supplies", Journal of Electronic Materials, vol. 30, No. 8, pp. 1012-1020 (2001).
Ferrenz, E. et al. "An improved method to spot-weld difficult junctions", Review of Scientific Instruments, vol. 72, No. 12, pp. 4474-4476 (Dec. 2001).
Amada Miyachi America, Inc "The Effects of Polarity on the Resistance Welding Process", ol. 3, No. 2, 2pgs. (Dec. 2015).
Iwase, T. et al. "Dissimilar Metal Joining between Aluminum Alloy and Hot-dip Aluminized Steel Sheet", Kobelco Technology Review, No. 28, pp. 29-34 (Oct. 2008).
Ikawa, H. et all. "Study on the Grain Growth in Weld-Heat Affected Zone (Report 6)—Calculation of Grain Size in Weld-Heat Affected Zone Using Heat Conduction Equation", Yosetsu Gakkai Shi, pp. 508-514 (Jan. 1977).
Zhang, S. et al. "A Study of the Microstructure and Grain Size at the Welding Heat Affected Zone of an Industrial Pure Aluminum", Advanced Materials Research, vols. 97-101, pp. 3247-3251 (2010).
Lampman, S. "Weld Integrity and Performance, Chapter 1, Weld Solidification", ASM Intl., 10 pgs.(1997).

(56) References Cited

OTHER PUBLICATIONS

Chang, B.H. "Numerical study on the effect of electrode force in small-scale resistance spot welding", Journal of Materials Processing Technology, vol. 139, pp. 635-641 (2003).
Bowers, R. et al. "Electrode Geometry in Resistance Spot Welding", Supplement to the Welding Journal, 45-51 (Feb. 1990).
Kou, S. "Welding Metallurgy—2nd Edition", John Wiley & Sons, 466 pgs. (2002).
Zhou, M. "Relationships between Quality and Attributes of Spot Welds", Supplement to the Welding Journal, pp. 72-77 (Apr. 2003).
Hasanbasoglu, A. et al. "Resistance spot weldability of dissimilar materials (AISI 316L-DIN EN 10130-99 steels)", Materials and Design, vol. 28, pp. 1794-1800 (2007).
Herbst, N. "Dissimilar Metal Welding", Peritech Pty Ltd, 23pgs. (Feb. 2002.
Solomon, H. "ASM Handbook, Welding, Brazing and Soldering—Fundamentals of Weld Solidification", ASM Intl., vol. 6., 12 pgs. (1993).
David, S.A. et al. "Welding: Solidification and Microstructure", JOM, pp. 14-20 (Jun. 2003).
ATI, Safety Data Sheet, version 4, 13 pgs. (May 2016).
Zhang, H. et al. "Resistance Welding, Fundamentals and Applications", Taylor & Francis Group, Chapters 1-2 (2006).
Rajamäki, P. "Fusion Weld Metal Solidification: Continuum from weld interface to centerline", Lappeenranta University of Technology, Chapters 1-5 (2008).
Borrisutthekul, R. et al. "Suppression of intermetallic reaction layer formation by controlling heat flow in dissimilar joining of steel and aluminum alloy", Materials Science and Engineering, vol. A, No. 467, pp. 108-113 (2007).

* cited by examiner

| Process Features | Conventional Brazing Process | Resistance Brazing Process |
|---|---|---|
| Equipment | Enclosed Furnace | Resistance welding power supply |
| Processing Time | Normally hours | Milliseconds |
| Environment | Controlled and closed atmosphere | Under shielding gas coverage in open environment |
| Arrangement of Components | All brazing components stationary, fastened by fixture | Components are moving under force during brazing cycle |
| Force | May or may not apply force | Under preset electrode force |
| Brazing Heat | Radiation heating in furnace | Heating by passing electric current |
| Braze Interface | Designed in the parent materials for filler to fill in | "Free flow" instantly by melted mating material |
| Filler Material | Third material with specific composition | Mating material is brazing material |

FIG. 3

METHOD OF FORMING A BRAZED JOINT HAVING MOLYBDENUM MATERIAL

This application claims the benefit of priority of U.S. Provisional Patent Application No. 62/674,948, filed May 22, 2018, entitled "Method Of Forming A Brazed Joint Having Molybdenum Material," and that patent application is incorporated herein by reference in its entirety to provide continuity of disclosure.

BACKGROUND

Field

The present disclosure relates to methods of joining metals. More specifically, the present disclosure relates to joining metal items using a resistance brazing process.

Background Information

Resistance welding is a process used to join metal components. For example, resistance welding can be used to join components of medical implant devices. The process utilizes heat generated by passing a controlled electrical current through a component to weld the component to another component. The components can be forced against each other at an interface surface that the electrical current passes through. While the electrical heating occurs on all elements in the electrical loop, most of the heat is generated at the interface. The localized heating causes the adjacent parent material, which begins in a solid state, to soften and liquefy. As the parent material liquefies, welding electrodes push the components together. The heating is discontinued to cause the liquid metal to solidify and form a weld joint between the components at the interface.

Manufacturing industries, such as the medical implant manufacturing industry, can be regulated by product quality requirements. For example, medical implant products may require the quality of a resistance weld joint to satisfy design and functional specifications. These specifications can include mechanical strength, electrical continuity, or vibration resistance requirements to ensure that the joint can sustain manufacturing, shipping, storage, and use conditions. Examples of functional specifications are bend or torsion test requirements, which characterize a bending or torsional strength of a welded joint.

SUMMARY

Existing weld joints used in the medical implant manufacturing industry include a molybdenum (Mo) pin joint. More particularly, medical device and/or battery assembly processes used in the medical implant manufacturing industry incorporate such pin joints as an electrical connection component, e.g., between a terminal pin and a current collector of a battery. The welding processes used to form the pin joint include resistance brazing processes. A bending or torsional strength of pin joints formed by conventional resistance brazing processes, however, can be inconsistent or may not meet quality requirements.

A method of forming a brazed joint having an improved joint strength is provided. The method can be used, for example, to form a brazed joint between a molybdenum (Mo) component, e.g., a terminal pin, and a non-molybdenum (non-Mo) component, e.g., a cross pin, of a battery case assembly. In an embodiment, the method includes pressing the non-Mo component against the Mo component at a contact point. A first electrical pulse having a constant voltage is applied to the non-Mo component to liquefy the non-Mo component and to form an interface liquid layer at the contact point. For example, the first electrical pulse can have the first constant voltage over a first pulse time such that the interface liquid layer has at least a predetermined thickness, e.g., a thickness of at least 0.003 inches.

In an embodiment, an electrical current of the first electrical pulse can be uncontrolled over the first pulse time. Due to a geometry of the components, a contact area between the components can increase as the non-Mo component liquefies. Given the constant voltage, the increase in the contact area can cause an increase in the electrical current over the first pulse time. Accordingly, a current density at the contact point can be maintained to consistently heat and liquefy the non-Mo component throughout the first pulse time.

One or more additional electrical pulses can be applied to the components after the interface liquid layer is formed to further build the joint around the contact point. For example, a second constant voltage or a constant power can be applied to the interface liquid layer. The electrical pulses can be limited by time or by displacement of the components as a pair of electrodes squeeze the components together to flow the non-Mo component around the Mo component.

In an embodiment, the interface liquid layer is cooled to form a brazed joint between the non-Mo component and the Mo component. The interface liquid layer can have a predetermined thickness, and thus, the brazed joint can be strong and have a reduced likelihood of joint failures.

In an embodiment, a Mo oxide layer is removed from the Mo component prior to the resistance brazing process to further contribute to a strong joint. For example, the Mo oxide layer can be removed by a mechanical removal process, e.g., a soda blast process, a glass bit blast process, a dry ice blast process, a silicon carbide blast process, or a manual polishing process using an abrasive substrate, or the Mo oxide layer can be removed by a laser ablation process. The prepared surface can form a stronger brazed joint.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

FIG. 3 is a table comparing conventional and resistance brazing processes, in accordance with an embodiment.

DETAILED DESCRIPTION

Embodiments describe a method of forming a brazed joint. The brazed joint can be used to join pins of a battery for a medical device. For example, the brazed joint can join a terminal pin of the battery to a cross pin of a current collector of the battery. The improved braze joint, however, may be used in other applications, such as in manufacturing electronic components, and thus, reference to use of the method and improved braze joint in the medical device battery is not limiting.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "distal" may indicate a first direction along an axis. Similarly, "proximal" may indicate a second direction opposite to the first direction. Such terms are provided to establish relative frames of reference, however, and are not intended to limit the use or orientation to a specific configuration described in the various embodiments below.

Figure 1:
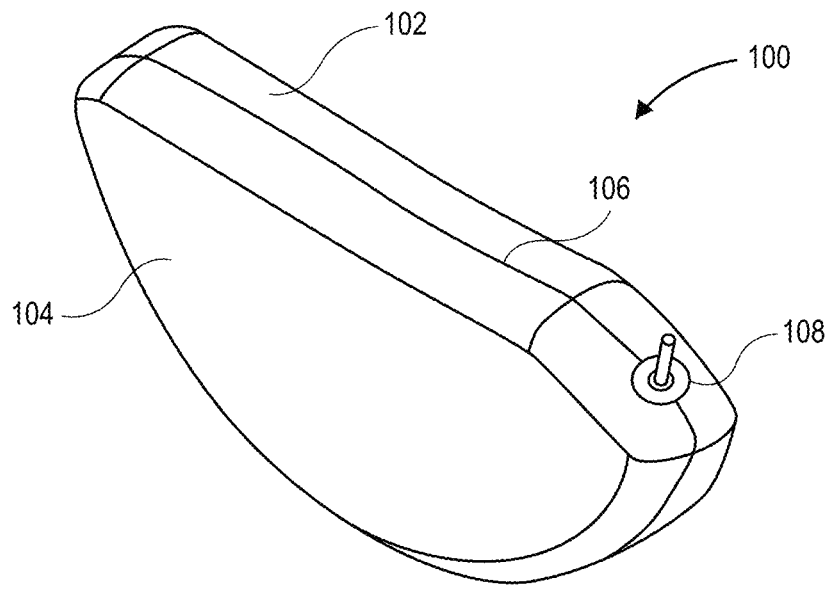
FIG. 1 is a perspective view of a battery case assembly, in accordance with an embodiment.

Referring to FIG. 1, a perspective view of a battery case assembly is shown in accordance with an embodiment. A battery case assembly 100 can include an electrochemical cell used to power an electronic device or a medical device. For example, the battery case assembly 100 can be a power source for a medical implant, e.g., a pacemaker device. Details of the electrochemical cell, such as the structure and materials of a cathode stack and an anode stack of the cell are omitted here for brevity.

In an embodiment, the battery case assembly 100 includes a case 102 and a lid 104. The case 102 and the lid 104 can be joined along a joint seam 106 to define an internal volume. The anode stack and the cathode stack (not shown) are mounted within the internal volume. The anode stack and the cathode stack form the electrochemical cell to generate electrical current. The electrical current may be used to power the medical device.

Electrical current can be delivered from the battery through an electrical feedthrough 108. The feedthrough 108 can be trapped between the case 102 and the lid 104. For example, the feedthrough 108 can include a ferrule, which can be tack welded to one or more of the case 102 or lid 104. A seal can be provided around the ferrule to close the battery case assembly 100.

Figure 2:
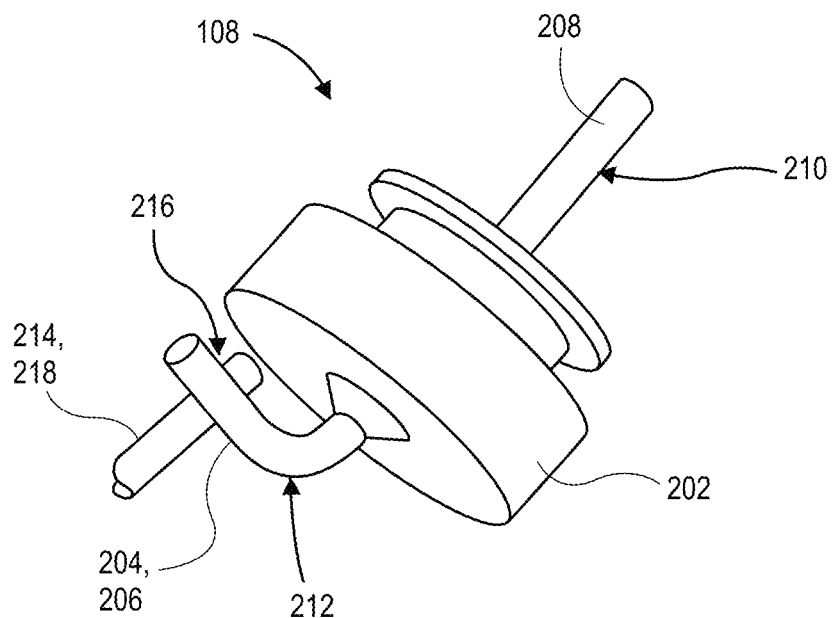
FIG. 2 is a perspective view of a feedthrough, in accordance with an embodiment.

Referring to FIG. 2, a perspective view of a feedthrough is shown in accordance with an embodiment. The feedthrough 108 can be a single pin feedthrough having an overmold 202 component and a molybdenum (Mo) component 204. The term Mo component 204 as used throughout this description encompasses a component having Mo material, e.g., formed from Mo or a Mo alloy. The Mo alloy can include Mo and one or more additional alloy constituents. In the case of the feedthrough 108, the Mo component 204 can be a Mo terminal pin 206, however, it will be appreciated that the Mo component 204 may be a different type of component in different applications. The overmold 202 component can include the ferrule, which is trapped between the case 102 and the lid 104. In an embodiment, the overmold 202 is formed from polypropylene, however, other suitable materials may be used.

The Mo terminal pin 206 can be a Mo wire component that passes through the overmold 202. More particularly, the overmold 202 can surround and seal against an outer surface 208 of the Mo terminal pin 206. The Mo pin can include an external segment 210 and an internal segment 212. In an embodiment, the external segment 210 extends straightly from the overmold 202 component. By contrast, the Mo pin can have a bend on an opposite side of the overmold 202 component, and the pin can extend at an oblique angle, e.g., perpendicular, to the external segment 210 over a portion of the internal length.

In an embodiment, the battery case assembly 100 includes a non-molybdenum (non-Mo) component 214 bonded to the Mo component 204 by a brazed joint 216. The term non-Mo component 214 as used throughout this description encompasses a component having no Mo material, e.g., formed from nickel (Ni), titanium (Ti), or another non-Mo material or material alloy. In the case of the feedthrough 108, the non-Mo component 214 can be a non-Mo cross pin 218, however, it will be appreciated that the non-Mo component 214 may be a different type of component, e.g., a plate or tab, in different applications. In any case, the brazed joint 216 that connects the Mo component 204, e.g., the Mo terminal pin 206, to the non-Mo component 214, e.g., the non-Mo cross pin 218, can be formed by a resistance brazing process as described below. Accordingly, the resistance brazing process can be used to bond the Mo component 204 to the non-Mo component 214.

Referring to FIG. 3, a table comparing conventional and resistance brazing processes is shown in accordance with an embodiment. A resistance brazing process differs from a conventional brazing process in several manners, and the processes should not be confused in the context of this description. Several process features that are unique to the resistance brazing process include: an arrangement of components, a brazing heat, and a filler material type. In a resistance brazing process, components are moved under force during the brazing cycle. A preset electrode force can be used to press the components together, as described below. The brazing heat is generated during the resistance brazing process by passing electrical current through the brazing materials. For example, the components can be pressed together at a braze interface, and as the electrical current moves through the interface the materials can melt and "free flow" instantly. In contrast to a conventional brazing process that uses a third material with a specific composition as a filler material, the resistance brazing process uses one or more of the mating materials themselves as the brazing material.

It has been shown that a brazed joint 216 formed between a Mo terminal pin 206 and a non-Mo cross pin 218 of a battery case assembly 100 by a conventional resistance brazing process has inconsistent mechanical properties. More particularly, a bending force applied to the non-Mo cross pin 218 while holding the Mo terminal pin 206 stationary can generate a failure at an interface between the pins. Conventional brazing process can also be sensitive to process parameters, lot-to-lot variation, and part-to-part variation, and thus, may not meet bending strength quality standards established for a medical device. A resistance brazing process that is less sensitive to parameters, lot-to-lot variation, and part-to-part varication, and which can consistently produce brazed joints 216 meeting the quality requirements of medical implants, is described below.

Effective formation of the brazed joint 216 is needed to fulfill the design function of a medical implant. For example, the brazed joint 216 must be robust to allow electrical current to be effectively transmitted from a battery to a device through the brazed joint 216. In an embodiment, a design requirement of the medical implant can require that the brazed joint 216 undergo bending over an angular range, e.g., 90 degrees, for one or more cycles. Particular findings that contributed to the development of the resistance brazing process described below, which forms the brazed joint 216 that can meet such requirements, are summarized here.

The effective formation of welds or brazed joints of dissimilar metals, e.g., Mo and Ni, can be evaluated for feasibility using a phase diagram. By way of example, in the Mo—Ni phase diagram, a Mo and Ni system has three types of intermetallic phases: MoNi, $MoNi_3$, and $MoNi_4$. It is observed, however, that only the MoNi intermetallic phase will be formed during solidification. The liquid metal of a Mo—Ni joint will remain only at or slightly higher than the melting temperature of Ni (1455° C.). Accordingly, based on the level rule and the relatively low temperature in the liquid metal, only a small amount of Mo will migrate into the liquid metal, and there may be insufficient Mo to form MoNi at a joint interface of the brazed joint 216. One can expect that the microstructure in the Mo—Ni joint will have a common solidification pattern that only depends on a cooling rate of the brazed joint. The microstructure will therefore depend on the joint design and brazing parameters. In the case of the resistance brazing process for a Mo—Ni system, this prediction is particularly likely due to the limited heat input and very short duration of the process.

Several factors are identified as contributing to the brazed joint 216 that meets joint requirements for production of the medical implant. It is discovered that liquefying a predetermined amount of metal during the resistance brazing process contributes to a joint that achieves the required bend strength. For example, in a Mo—Ni system, depending on geometry, brazed joints that were formed with a liquid metal layer having a thickness of at least 0.003 inches consistently met the bend strength requirements discussed above. As described below, the formation of such a liquid metal layer, having a thickness of at least a predetermined value, is dependent on the brazing heat applied during formation. Such heat can be controlled in a particular manner that avoids current shunting effects and provides favorable results.

Figure 4:
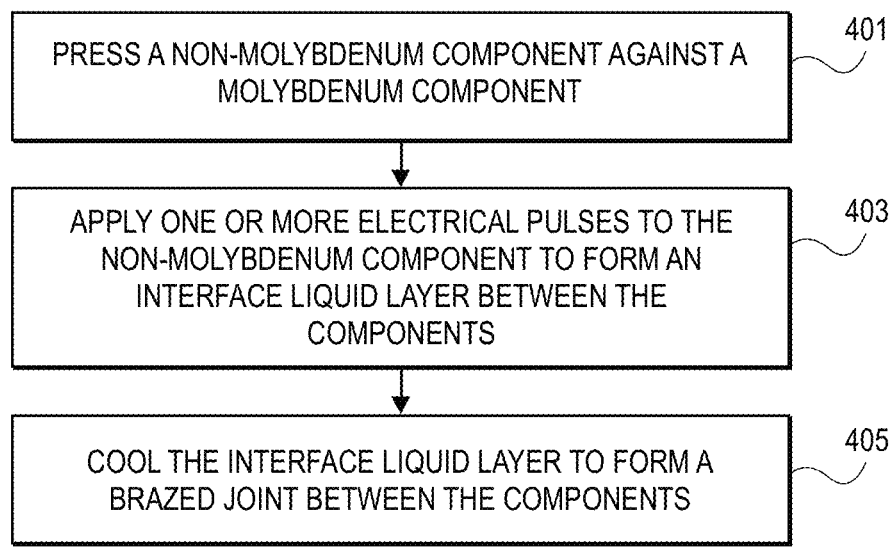
FIG. 4 is a flowchart of a method of forming a brazed joint between a molybdenum component and a non-molybdenum component, in accordance with an embodiment.

Referring to FIG. 4, a flowchart of a method of forming a brazed joint between a molybdenum component and a non-molybdenum component is shown in accordance with an embodiment. The operations of FIG. 4 apply to the illustrations of FIGS. 5-8, and are described in combination with those figures below.

Figure 5:
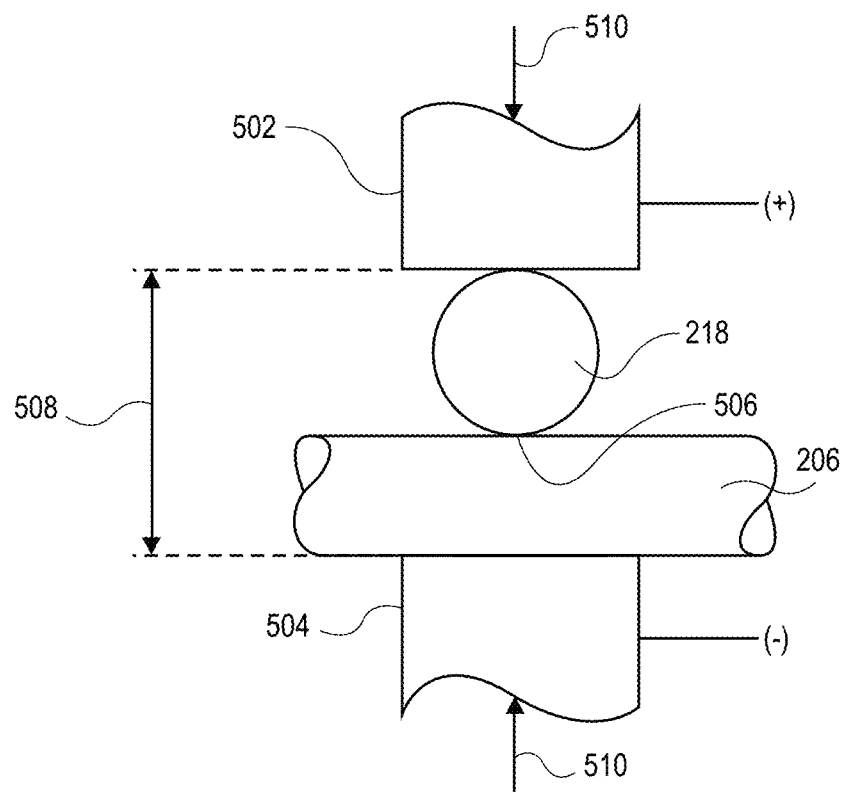
FIG. 5 is a side view of components being clamped between a pair of electrodes during a resistance brazing process, in accordance with an embodiment.

Referring to FIG. 5, a side view of components being clamped between a pair of electrodes during a resistance brazing process is shown in accordance with an embodiment. At operation 401, a non-Mo component 214 is pressed against a Mo component 204. In an embodiment, the non-Mo component 214 is the cross pin 218 of the current collector, e.g., a Ni cross pin, in the battery case assembly 100, and the Mo component 204 is the terminal pin 206 of the battery case assembly 100. The non-Mo component 214 and the Mo component 204 can both have the geometry of round wires, and thus, the components may be used to form a wire-to-wire joint.

The non-Mo cross pin 218 and the Mo terminal pin 206 can be clamped between a pair of electrodes. For example, a first electrode 502 can press against the non-Mo cross pin 218 and a second electrode 504 can press against the Mo terminal pin 206 to press the brazing components together at a contact point 506. The joint geometry can therefore include two round wires cross-placed to each other and held between the pair of electrodes.

During the resistance brazing process, displacement of the brazed joint 216 can be controlled by movement of the pair of electrodes. More particularly, clamping surfaces of the electrodes can be separated by a clamp distance 508, and a user can control the brazing equipment to increase or decrease the clamp distance 508. For example, as described below, when the non-Mo cross pin 218 is liquefied, an electrode force 510 can be applied to the components to reduce the clamp distance 508 and to drive the components together to form the brazed joint 216. A range of such displacement can be controlled in combination with heating parameters to achieve a sufficiently strong joint.

Figure 6A:
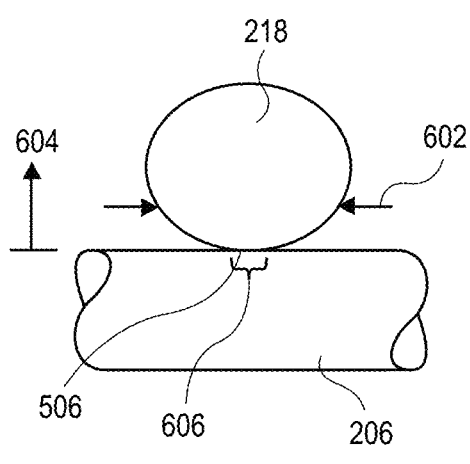
FIGS. 6A-6B are side views of components being joined in a resistance brazing process, in accordance with an embodiment.

Referring to FIG. 6A, a side view of components being joined in a resistance brazing process is shown in accordance with an embodiment. At operation 403, one or more electrical pulses is applied to the non-Mo component 214 to form an interface liquid layer 610 between the components. In an embodiment, a cross-sectional width 602 of the non-Mo component 214 increases in a direction 604 away from the contact point 506. For example, in the case of round wires, the cross-sectional width 602 increases from the contact point 506 to a diameter of the round wire along the centerline of the round cross-section. The cross-sectional width 602 of the Mo component 204 may similarly increase away from the non-Mo component 214, e.g., when both components are round pins. Alternatively, one or more of the components can have a rectangular cross-sectional profile, e.g., as in a plate or a tab construction.

Figure 6B:
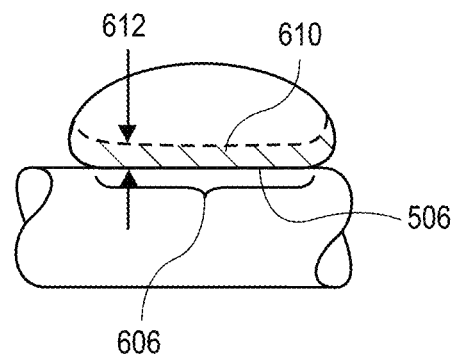

Notably, when the cross-sectional width 602 of at least one of the components is smaller at the contact point 506 than at the midpoint of the component, the component has a contact area 606 that is less than a maximum cross-sectional width of the component. This is notable because, as described below, a contact resistance between the components may be higher in the un-displaced state (FIG. 6A) as compared to the displaced state (FIG. 6B). More particularly, the smaller the contact area 606, the higher the electrical resistance between the components at the contact point 506. Accordingly, unless adjustments are made, the current density and heating at the contact point can vary while the contact area changes.

Referring to FIG. 6B, a side view of components being joined in a resistance brazing process is shown in accordance with an embodiment. When the resistance brazing process is activated and a first electrical pulse is delivered from the first electrode 502 to the second electrode 504 through the components, an electrical current of the pulse can flow through the contact area 606 and cause heating of the components at the contact point 506. The initial contact resistance can be relatively high, and thus, the first electrical pulse applied to the non-Mo component 214 can liquefy the non-Mo component 214 to form an interface liquid layer 610 at the contact point 506. The Mo component 204 can have a first melting temperature, e.g., 2623° C., and the non-Mo component 214 can have a second melting temperature lower than the first melting temperature, e.g., 1455° C. In an embodiment, the resistance brazing process liquefies the non-Mo component 214 by heating the components to a brazing temperature between the first and second melting temperatures, and thus, the resistance brazing process is practically a brazing process in which only the non-Mo material melts and will stay in a liquid state throughout the process. Additional heating, e.g., through the one or more electrical pulses, will further melt the non-Mo component 214 without melting the Mo component 204. Accordingly, the resistance brazing process uses the mating materials as a filler material. More particularly, the non-Mo material can flow around the Mo surface during the brazing process to act as a filler and form the brazed joint.

When the interface liquid layer 610 forms, the electrode force 510 can be controlled to displace the electrodes and squeeze the components together. The contact area 606 can increase as the displacement changes and the pins are squeezed together. More particularly, the contact area 606 between the components can increase during the first electrical pulse such that the contact resistance, which is inversely related to the contact area 606, decreases. It will be appreciated that, in the case of the electrical pulse having a constant electrical current, a current density at the interface between the components will decrease as the contact area 606 increases. Such a decrease would result in a reduction in the heating rate at the joint. The reduction in current density may be exacerbated by shunting effects that result from displacement of the electrode. More particularly, as the non-Mo component 214 deforms and the first electrode 502 approaches the Mo component 204, electrical current may be shunted directly to the Mo component 204 rather than flowing through the joint interface, and thus, heating at the joint may be further compromised. Accordingly, when a constant current control parameter is used in the resistance brazing process, a limited amount of heat can be generated and there may be insufficient liquid metal formed to produce an effective joint.

When there is insufficient or poorly controlled generation of the interface liquid layer 610, a thickness 612 of the interface liquid layer 610 may be too thin to adequately reinforce the brazed joint 216. More particularly, it has been shown that the optimal process parameters for a Mo—Ni wire-to-wire joint are those that generate an interface liquid layer 610 having at least a predetermined thickness. For example, the thickness 612 can have a predetermined value of at least 0.003 inches. Such a thickness has been shown to flow the non-Mo component 214 around the Mo component 204 in a manner that sufficiently reinforces the brazed joint 216 around the Mo component 204 to achieve the required bend strength. Such a thickness also yields parts having a reduced likelihood of brazing defects, e.g., spatters and blown brazes, which leads to a more reliable production environment. A smaller liquid layer, without such a joint reinforcement, can result in early mechanical failure of the brazed joint 216.

It should now be understood that an effective brazed joint 216 depends on the parameters of the brazing process, and given the difference in melting temperature between the non-Mo component 214 and the Mo component 204, the parameters can be selected to cause a physical response in the non-Mo component 214 that results in the interface liquid layer 610 having the thickness 612 of at least the predetermined thickness value, e.g., 0.003 inches. Furthermore, the displacement of the electrodes, e.g., a set down distance defined by the clamp distance 508, can be controlled to reduce a likelihood of shunting that may compromise control of the heat applied to the interface liquid layer 610. Accordingly, a balance between heating of the components in a manner that accommodates changes in the contact resistance and applying a force to the joint to ensure intimate contact of the components without causing shunting can reliably produce strong brazed joints 216.

Figure 7:
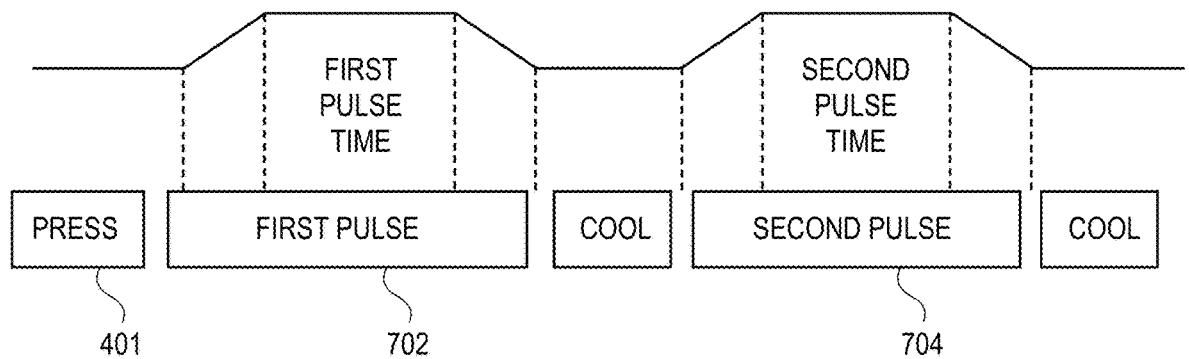
FIG. 7 is a diagram of a sequence of operations in a resistance brazing process, in accordance with an embodiment.

Referring to FIG. 7, a diagram of a sequence of operations in a resistance brazing process is shown in accordance with an embodiment. The sequence includes, at operation 401 as described above, pressing the components together prior to applying one or more electrical pulses. For example, the components can be cold clamped between the pair of electrodes for 500 milliseconds.

To initiate the heating process, a first electrical pulse 702 is applied to the non-Mo component 214 to form the interface liquid layer 610. The first electrical pulse 702 can be configured to maintain the current density at the brazing interface as the contact area 606 between the components increases. In an embodiment, the first electrical pulse 702 has a constant voltage over a first pulse time. For example, the first electrical pulse 702 can ramp up to a predetermined voltage over a ramp time, and then hold the first constant voltage within a range of 0.98 to 1.040 V, e.g., at 1.020 V, over the first pulse time. The ramp time can be less than the first pulse time. For example, the ramp time can be between 0.1 to 5 milliseconds, e.g., 0.2 or 1 milliseconds, and the first pulse time can be in a range of 1 to 20 milliseconds, e.g., 4 or 16 milliseconds. As described further below, the heating process can be achieved using several pulses. For example, the several pulses can include the first pulse having the first constant voltage, and one or more additional pulses. The additional pulses can include any combination of constant voltage, constant power, or constant current parameters. The additional pulse parameters can be selected to generate sufficient heat to produce a desired or predetermined amount of molten material.

Figure 8:
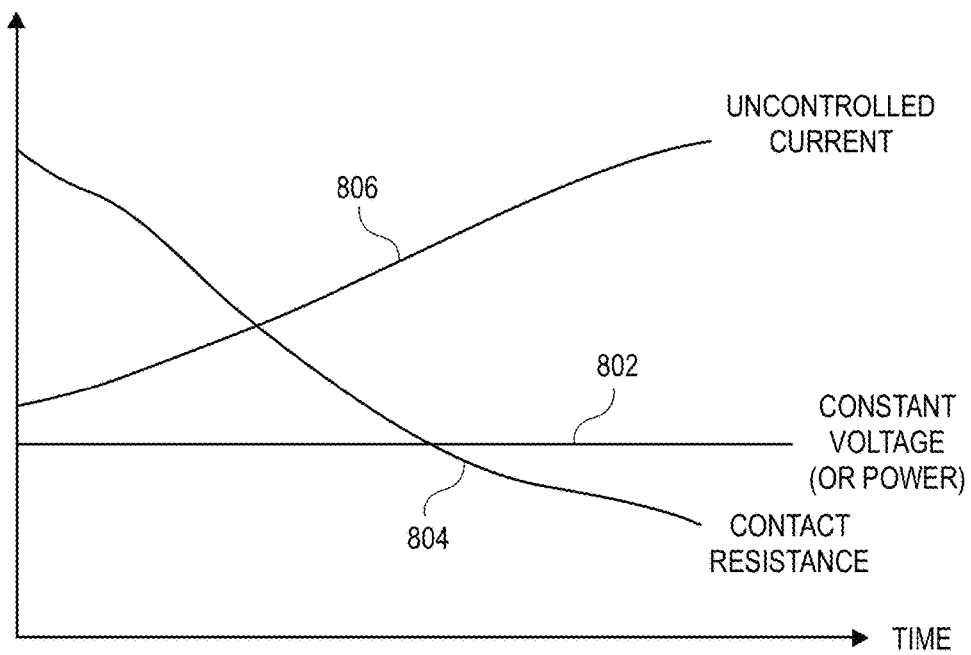
FIG. 8 is a chart of electrical parameters during an operation of a resistance brazing process, in accordance with an embodiment.

Referring to FIG. 8, a chart of electrical parameters during an operation of a resistance brazing process is shown in accordance with an embodiment. The first electrical pulse 702 having a constant voltage curve 802 can provide consistent heating within the wire-to-wire joint geometry. As the components are squeezed together and the contact area 606 increases, a contact resistance curve 804 of the brazing process can decrease. More particularly, the initial contact resistance can be relatively high, and as the brazing set down action starts, the contact resistance can reduce. As described above, such reduction may cause a reduced current density in the case of a controlled current pulse. By contrast, an electrical current of the first electrical pulse 702 can be uncontrolled over the first pulse time. More particularly, the uncontrolled current, rather than being controlled through electrical equipment connected to the pair of electrodes, can be self-controlled by the geometry of the joint itself. As the contact area between the components increases over the first pulse time, the constant voltage control by the electrical equipment can cause the electrical current curve 806 to correspondingly increase over the first pulse time. The increase in the electrical current curve 806 depends on the surface contact between the components. Accordingly, the electrical current can increase to maintain a current density at the interface. The maintained current density can heat the interface more uniformly over the first pulse time, and thus, the components can be consistently heated to a brazing temperature between the first and second melting temperatures to form the interface liquid layer 610 in the non-Mo component 214.

Notably, even if the first electrode 502 was to contact the Mo component 204 during the first pulse time, the shunting effects of such an occurrence could be overcome by the constant voltage pulse character. In such case, the current would increase to maintain the current density at the joint interface. Nonetheless, shunting can be avoided, and the thickness 612 of the interface liquid layer 610 can be controlled, through movement of the electrodes.

In an embodiment, intimate contact between the components and deformation of the non-Mo component 214 can be controlled via the electrode force 510. Displacement of the electrodes can be force/time controlled. For example, in the case of Mo and Ni wires having a wire diameter of 0.020 inches, the electrode force 510 can be set in a range of 0.5 to 50 lbf, e.g., 7 lbf. The electrode force 510 can be applied by actuators of the brazing equipment for a predetermined duration. Such force can be adequate to maintain contact between the components at the contact point 506 and over the contact area 606. The force can also drive the electrodes together (change the set down distance) to reduce the clamp distance 508 during the first electrical pulse 702.

Displacement of the electrodes can also be motion-controlled via the brazing equipment. The actuators can squeeze the brazing components during the first pulse time with a sufficient force to adjust the clamp distance 508 to a predetermined distance. Movement can also be limited to a predetermined displacement. For example, the brazing equipment can limit movement of the electrodes to ensure that the clamp distance 508 is not less than a thickness of the Mo component 204. In other words, displacement can be limited to a range from 0 to a diameter of the non-Mo component 214, e.g., 0.020 inches, to reduce a likelihood of damage to the components or the brazing equipment.

In an embodiment, the set down control can limit a duration of the first electrical pulse 702. For example, when the clamp distance 508 reduces over the first pulse time to a predetermined displacement value, the first pulse time can end, and the brazing sequence can move onto a next sequence operation. The predetermined displacement value can be a distance at which the thickness 612 of the interface liquid layer 610 is known to result in sufficient joint quality.

The first electrical pulse 702 can provide a pre-conditioning operation to control joint displacement (or set down distance) that ensures sufficient non-Mo liquid metal is formed around the Mo component 204. When the first electrical pulse 702 ends (either force/time or displacement limited), the electrical voltage of the pulse can ramp down over a ramp time. For example, the ramp time can be between 0.1 to 5 milliseconds, e.g., 1 millisecond. When the voltage ramps down to zero, a cooling operation of the process sequence can commence. The cooling operation can include no application of electrical current to the work pieces for a cooling time. For example, the cooling time can be between 0.1 to 5 milliseconds, e.g., 1 millisecond.

In an embodiment, the brazing process can include the application of one or more additional electrical pulses to the work pieces to generate sufficient joint metal to achieve the required bending strength. More particularly, a second electrical pulse 704 can be applied to the non-Mo component 214 and the Mo component 204 to cause continued heating of the interface liquid layer 610. The second electrical pulse 704, and any other additional pulses in the process, can include one or more of constant voltage, constant power, or constant current parameters. For example, the second electrical pulse 704 of the dual pulse brazing process can have a constant power.

The constant power pulse may be advantageously applied to certain material combinations, such as the Mo—Ni system described above. The constant voltage pulse may be advantageously applied to other material combinations, such as the Mo—Ti system mentioned above. The second electrical pulse 704 can ramp up to a predetermined power or voltage over a ramp time, and then hold the power or voltage constant over a second pulse time. The ramp time can be less than the second pulse time. For example, the ramp time can be between 0.1 to 10 milliseconds, e.g., 1 or 10 milliseconds, and the second pulse time can be in a range of 10 to 50 milliseconds, e.g., 12 or 25 milliseconds.

The constant power or voltage during the second pulse time takes advantage of the self-regulating nature of the brazed joint 216 described above. As the contact resistance reduces during the second pulse time, the current can increase to maintain the current density and heat the interface liquid layer 610. In the case of the constant power sequence, the power can be held in a range of 0.1 to 20.0 kW, depending on a size of the components. For example, a constant power of 0.5 kW can be used when the non-Mo component 214 is a 0.020 inch diameter wire. Similarly, in the case of the constant second voltage power sequence, the second voltage can be held in a range of 0.1 to 20.0 V, depending on the size of the components. For example, a constant second voltage in a range of 1.21 to 1.27 V, e.g., 1.24 V, can be used over the second pulse time when the Mo component 204 is a Mo pin or wire and the non-Mo component 214 is a Ti plate. The constant power and/or constant voltage pulses reduce variations in heating caused by wire-to-wire configurations, lot-to-lot variations in component sizes, and other geometry-based variations.

In an embodiment, when the brazing process incorporates a dual-pulse sequence including a first electrical pulse 702 having a first constant voltage and a second electrical pulse 704 having a second constant voltage, the second constant voltage can be less than the first constant voltage. For example, in the Mo—Ti wire-to-plate system, the first constant voltage can be 1.60 V and the second constant voltage can be 1.24 V.

At operation 405, the interface liquid layer 610 is cooled to form the brazed joint 216 between the non-Mo component 214 and the Mo component 204. When the second electrical pulse 704 ends (either force/time or displacement limited), the electrical power or voltage of the pulse can ramp down over a ramp time. For example, the ramp time can be between 0.1 to 5 milliseconds, e.g., 1 or 3 milliseconds. When the power or voltage ramps down to zero, a cooling operation of the process sequence can commence. The cooling operation can include no application of electrical current to the work pieces for a cooling time. For example, the cooling time can be between 50 to 500 milliseconds, e.g., 100 milliseconds. The components can be held in intimate contact during the cooling period to allow the interface liquid layer 610 to solidify. When the liquid layer solidifies, the brazed joint 216 is formed. The brazed joint 216 can meet the bend strength requirements using the above-described process parameters that form a sufficiently thick interface liquid layer 610 in a self-regulating manner.

Figure 9:
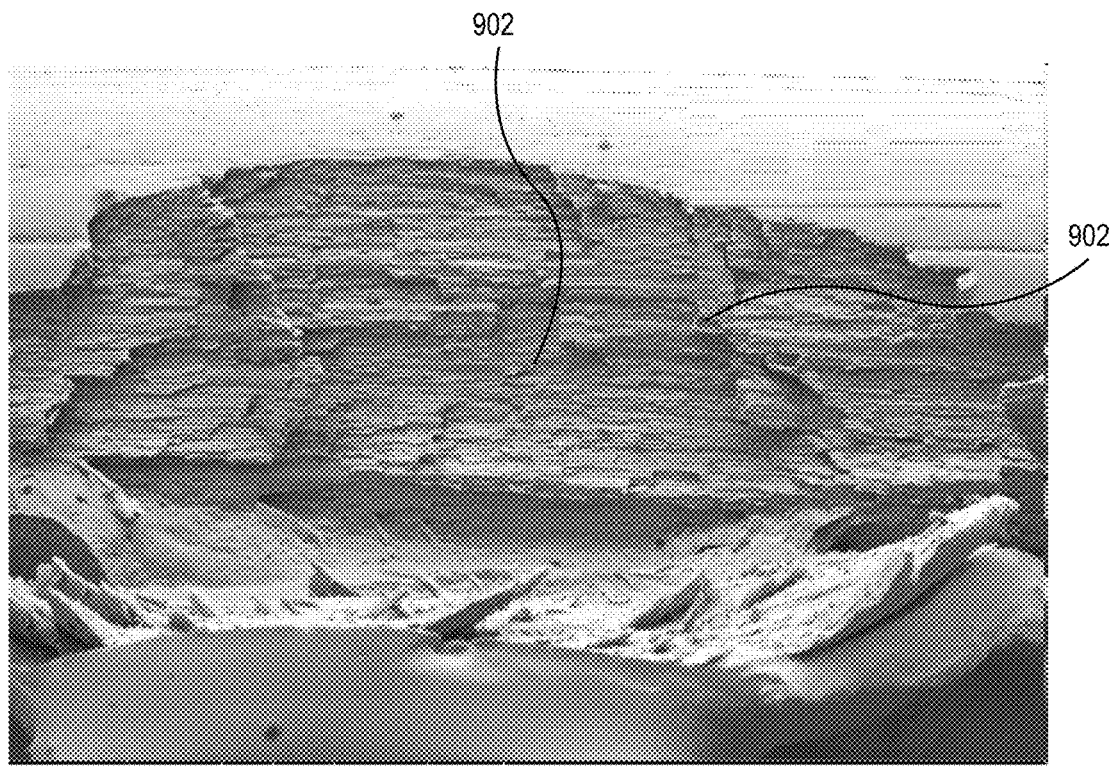
FIG. 9 is a pictorial view of a fracture surface of a brazed joint failure, in accordance with an embodiment.

Referring to FIG. 9, a pictorial view of a fracture surface of a brazed joint failure is shown in accordance with an embodiment. A particular failure mode has been observed by analyzing resistance brazed joint failures. This failure mode differs from failure modes that are seen in joints formed by conventional brazing processes. In a failed Mo/Ni braze joint, a crack is formed between the Mo pin and the Ni pin at the braze joint interface. It is notable that no polishing of the Mo pin surface was used during the formation of the failed resistance brazed joint 216. A magnified view of the fracture surface in the Mo pin material shows a granular microstructure with a step-like fracture 902 feature. Although this fracture morphology is suggestive of quality issues in the base Mo material, such as excessive material brittleness or surface contamination, further analyses yielded unexpected results.

An energy-dispersive X-ray spectroscopy (EDX) analysis of a surface of the Mo component 204 revealed that the surface of the Mo component 204 is composed mostly of Mo oxide materials. This is evident from EDX samples taken in areas of the Mo component 204 that are spaced apart from the interface. Accordingly, a majority of the Mo component 204 can have a surface composed of Mo and oxygen, indicating that the surface is primarily composed of MO oxides.

An EDX analysis was performed on the fracture 902 surface of the failed braze joint of FIG. 9. The analyzed surface was a Ni portion of the failed braze interface. The EDX samples on the Ni side of the braze interface indicated that the surfaces were covered with Mo and oxygen. This result is unexpected in light of the presupposition that joint failures are caused by quality issues in the base Mo material. More particularly, if surface contamination on the Mo surface were causing the joint failures, Mo should not be detected on the Ni side of facture surface. Therefore, it has been discovered that a Mo oxide layer is attached to the Ni liquid metal and a fracture 902 surface is formed between the Mo oxide layer and Mo bulk material when torsion failure occurs.

Figure 10:
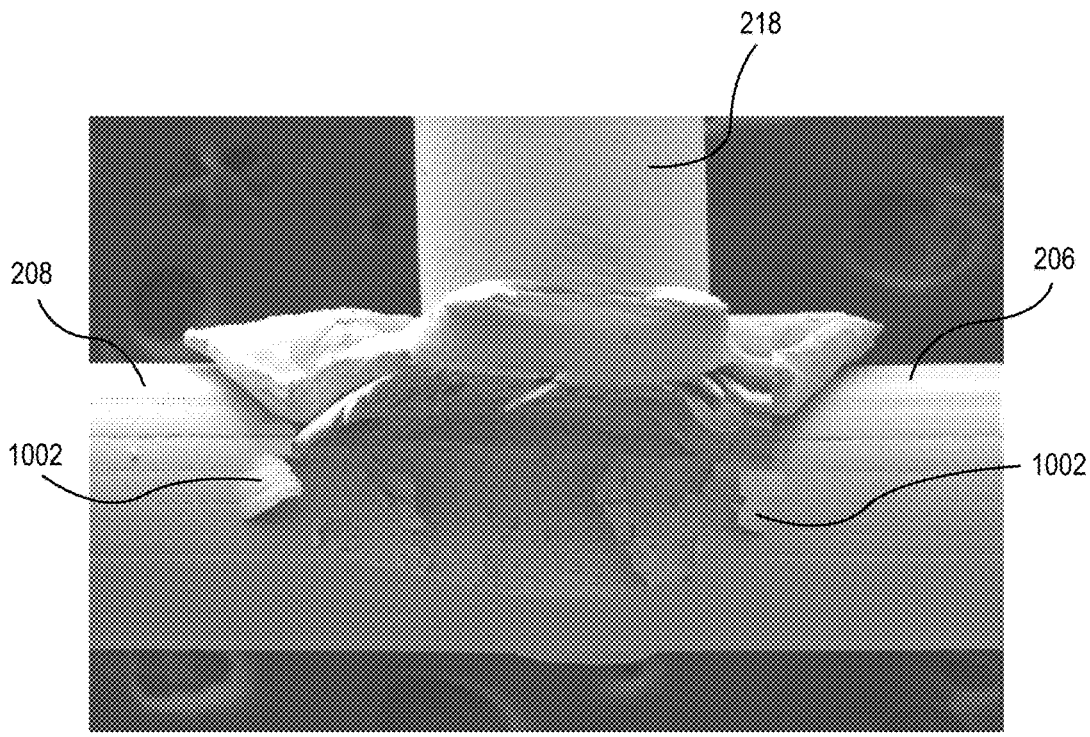
FIG. 10 is a pictorial view of a bend-tested brazed joint, in accordance with an embodiment.

Referring to FIG. 10, a pictorial view of a bend-tested braze joint is shown in accordance with an embodiment. Further evidence of a Mo oxide layer 1002 can be seen on the surface of the Mo terminal pin 206 after joint failure. More particularly, peeling effects of Mo oxides are observable on the torsion failure samples. A thickness of the Mo oxide layer 1002 is estimated to be around 5 microns ($10^{-6}$ meters).

Based on the analysis above, it was discovered that removal of surface oxides from the Mo component 204 can maintain a consistency of the resistance brazing process described above. By cleaning the Mo component 204, weakness between surface oxide and the Mo bulk material can be reduced, and thus, bond failures can be reduced. A method of improving a resistance brazed joint 216 by preparing the surface of a Mo component 204, such as the Mo terminal pin 206, to achieve consistent joint strength of the brazed joint 216 is described below.

In an embodiment, the surface preparation of the Mo component 204 includes removing all or a portion of the Mo oxide layer 1002 from an outer surface 208 of the Mo component 204, e.g., the Mo terminal pin 206. The Mo oxide layer 1002 can be removed, by way of example, using a mechanical process or a laser ablation process. Suitable mechanical removal processes include: a soda blast process, a glass bit blast process, a dry ice blast process, a silicon carbide (SiC) blast process, or manual polishing process using an abrasive substrate, such as sand paper or a ceramic plate. A laser ablation process for preparing the surface of the Mo pin includes applying a laser light to the outer surface 208 of the Mo pin to remove the Mo oxide layer 1002 from the Mo bulk material. The laser light can instantly vaporize (and remove) the Mo oxide layer 1002. Process parameters are omitted here for brevity.

It is notable that each of the removal processes described herein are suitable for treating the Mo terminal pin 206 after it is preassembled with other materials. This can be an important consideration in applications such as medical or electronic devices, where Mo components 204 are preassembled with comparatively delicate materials prior to surface preparation. In other applications contemplated by this description, however, the Mo terminal pin 206 may be subjected to more aggressive cleaning processes, such as a chemical cleaning process that includes immersing the Mo pin in a high temperature treatment.

The brazed joint 216 can be a joint between the Mo terminal pin 206 and the non-Mo cross pin 218, and prior to joining the materials, the Mo terminal pin 206 can be hand dressed to remove the Mo oxide layer 1002 from the Mo bulk material. Manual hand dressing of the Mo terminal pin 206 can include the use of an abrasive substrate, such as SiC sand paper, to abrasively remove the Mo oxide layer 1002. After hand dressing the Mo terminal pin 206 with SiC sand paper, all or a portion of the outer surface 208 of the Mo terminal pin 206 can be free of Mo oxides. Accordingly, the Mo terminal pin 206 of the battery case assembly 100 described above may not include a Mo oxide layer 1002. In an embodiment, a comparison between an unprepared Mo terminal pin 206 and the hand dressed Mo terminal pin 206 indicates that the surface-prepared Mo pin has less than 10% as much Mo oxide on the outer surface 208 as compared to the unprepared Mo pin.

Testing of a pin joint formed according to the method described above has shown improvement in joint strength as compared to pin joints that are formed without removing the Mo oxide layer 1002 or without the multi-pulse, self-regulating process parameters. The improvement of joint integrity, reliability of product quality, and increase in production throughput stemming from fewer manufacturing rejections can provide an advantage over the conventional brazing processes currently used in industry.

The method of forming a brazed joint 216 described above can have utility in several industries. For example, the improved braze joint can be applicable to medical devices or components or batteries, e.g., to form a pin joint in the medical device battery as described above. It will be appreciated, however, that the improved brazed joint 216 has utility in other industries and products, such as in electronic component manufacturing. By way of example, similar improvements in joint strength has been observed in resistance brazed joints 216 between a Mo pin and a titanium plate of an electronic device, e.g., when the Mo oxide layer 1002 is removed from the pin prior to brazing to the plate using a multi-pulse brazing process. Accordingly, the particular Mo component 204 and non-Mo component 214 system described herein are provided by way of example, and other geometries and materials may be used to form a joint applicable to many industries.

Figure 11:
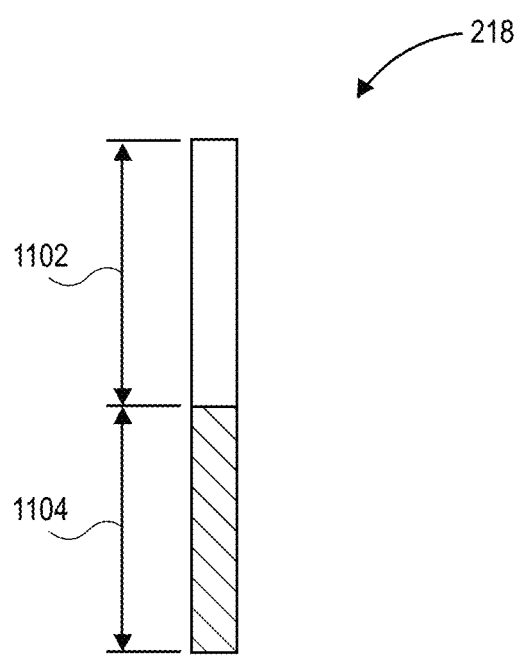
FIG. 11 is a side view of a battery cross pin, in accordance with an embodiment.

Referring to FIG. 11, a side view of a battery cross pin is shown in accordance with an embodiment. The Mo terminal pin 206 can be electrically connected to a current collector of the electrochemical cell that is contained by the battery case assembly 100. For example, the internal segment 212 can be electrically connected to a cathode current collector. In an embodiment, electrical current flows from the cathode current collector to the Mo terminal pin 206 to power the medical device. The electrical current can pass from the cathode through the non-Mo cross pin 218 to the Mo terminal pin 206.

In an embodiment, the battery cross pin is a pin formed from one or more non-Mo materials. The pin can be a combination of non-Mo materials, such as Ni or any of the other non-Mo materials as described above. For example, the non-Mo materials can be 200 series nickel, titanium, etc. In an embodiment, the battery cross pin includes a core region 1102 and a plated region 1104. The plated region 1104 can be a portion of the pin having a lower melting temperature than the core region 1102. The plated region 1104 may be a portion of the pin that is plated or coated, as shown in FIG. 11. For example, the plated region 1104 can include Ni plating having a 99.7% minimum purity and a maximum roughness (thickness) of 30 microns. By contrast, the core region 1102 can be formed from titanium or a lower-purity nickel alloy.

The terminal pin and the cross pin can be variously sized. For example, the pin diameters may be in a range of 0.001-inch to 5.0-inch in diameter. For example, the Mo terminal pin 206 and the non-Mo cross pin 218 can have a same diameter of 0.020-inch. Such sizing is provided by way of example, however, and the Mo component 204 and non-Mo component 214 of the brazed joint 216 can have other geometries and sizes, which are the same or different from each other.

In an embodiment, the internal segment 212 of the Mo pin is joined to either the plated (or coated) region 1104 of the cross pin, or the core region 1102 of the cross pin, using resistance brazing. As described above, the outer surface 208 of the internal segment 212 can be cleaned using a surface preparation process to remove a Mo oxide layer 1002. The pins can then be joined using the brazing process described above to form the improved resistance brazed. For example, the brazed joint 216 can be formed between the Mo terminal pin 206 and the plated region 1104 or the core region 1102 of the non-Mo cross pin 218.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    pressing an outer surface of a non-molybdenum (non-Mo) cross pin against a molybdenum (Mo) terminal pin at a contact point, wherein the non-Mo cross pin is a round pin such that a cross-sectional width of the non-Mo cross pin increases in a direction away from the contact point, wherein the non-Mo cross pin includes a plated region directly on and surrounding a core wire, the plate region having the outer surface in contact with the Mo terminal pin at the contact point, and wherein the plated region has a lower melting temperature than the core wire;
    applying a first electrical pulse to the non-Mo cross pin to liquefy the non-Mo cross pin to form an interface liquid layer at the contact point, wherein the first electrical pulse has a first constant voltage over a first pulse time such that the interface liquid layer has at least a predetermined thickness; and
    cooling the interface liquid layer to form a brazed joint between the non-Mo cross pin and the Mo terminal pin, wherein a cross-sectional shape of the outer surface of the non-Mo cross pin taken at the contact point is flat at the contact point and round opposite of the contact point.

2. The method of claim 1 further comprising applying a second electrical pulse to the interface liquid layer, wherein the second electrical pulse has one or more of a constant power, a constant voltage, or a constant current over a second pulse time.

3. The method of claim 2, wherein the second electrical pulse has a second constant voltage over the second pulse time.

4. The method of claim 1, wherein an electrical current of the first electrical pulse is uncontrolled over the first pulse time.

5. The method of claim 4, wherein a contact area between the pins increases over the first pulse time such that the electrical current increases over the first pulse time.

6. The method of claim 1, wherein the non-Mo cross pin and the Mo terminal pin are pressed between a pair of electrodes separated by a clamp distance, wherein the clamp distance reduces over the first pulse time, and wherein the first pulse time ends when the clamp distance reaches a predetermined displacement value.

7. The method of claim 1 further comprising removing a Mo oxide layer from the outer surface of the Mo terminal pin.

8. The method of claim 7, wherein removing the Mo oxide layer is by one or more of a mechanical removal process or a laser ablation process.

9. The method of claim 8, wherein the mechanical removal process includes one or more of a soda blast process, a glass bit blast process, a dry ice blast process, a silicon carbide blast process, or a manual polishing process using an abrasive substrate.

10. The method of claim 1, wherein the Mo terminal pin has a first melting temperature, wherein the non-Mo cross pin has a second melting temperature lower than the first melting temperature, and wherein applying the first electrical pulse heats the Mo terminal pin and the non-Mo cross pin to a brazing temperature between the first and second melting temperatures.

11. The method of claim 1, wherein the Mo terminal pin is a terminal pin of a battery case assembly, and wherein the non-Mo cross pin is a cross pin of the battery case assembly.

12. A battery case assembly, comprising:
    a molybdenum (Mo) terminal pin; and
    a non-molybdenum (non-Mo) cross pin coupled to the Mo terminal pin by a brazed joint, wherein formation of the brazed joint includes pressing an outer surface of the non-Mo cross pin against the Mo terminal pin at a contact point such that a cross-sectional width of the non-Mo cross pin increases in a direction away from the contact point prior to formation of the brazed joint, and applying a first electrical pulse to the non-Mo cross pin to liquefy the non-Mo cross pin to form an interface liquid layer at the contact point, wherein the first electrical pulse has a first constant voltage over a first pulse time such that the interface liquid layer has at least a predetermined thickness, and wherein a cross-sectional shape of the outer surface of the non-Mo cross pin taken at the contact point after formation of the brazed joint is flat at the contact point and round opposite of the contact point, wherein the non-Mo cross pin includes a plated region directly on and surrounding a core wire, the plated region having the outer surface in contact with the Mo terminal pin at the contact point, and wherein the plated region has a lower melting temperature than the core wire.

13. The battery case assembly of claim 12, wherein formation of the brazed joint further includes applying a second electrical pulse to the interface liquid layer, wherein the second electrical pulse has one or more of a constant power or a constant second voltage over a second pulse time.

14. The battery case assembly of claim 12, wherein a contact area between the Mo terminal pin and the non-Mo cross pin increases over the first pulse time such that an electrical current increases over the first pulse time.

15. The battery case assembly of claim 12, wherein the Mo terminal pin does not include a Mo oxide layer.

16. The battery case assembly of claim 12, wherein the plated region includes a first purity of a non-Mo material, wherein the core wire includes a second purity of the non-Mo material, and wherein the first purity is higher than the second purity.

17. The battery case assembly of claim 16, wherein the brazed joint is between the Mo terminal pin and one or more of the plated region or the core wire of the non-Mo cross pin.

18. The battery case assembly of claim 12, wherein the Mo terminal pin has a first melting temperature, and wherein the non-Mo cross pin has a second melting temperature lower than the first melting temperature.

* * * * *